United States Patent [19]
Dietz et al.

[11] Patent Number: 5,334,558
[45] Date of Patent: Aug. 2, 1994

[54] LOW TEMPERATURE GLASS WITH IMPROVED THERMAL STRESS PROPERTIES AND METHOD OF USE

[75] Inventors: Raymond L. Dietz, Georgetown; David M. Peck, Danvers, both of Mass.

[73] Assignee: Diemat, Inc., Topsfield, Mass.

[21] Appl. No.: 962,924

[22] Filed: Oct. 19, 1992

[51] Int. Cl.$^5$ ............................................. C03C 3/12
[52] U.S. Cl. ........................................ 501/41; 501/17; 501/19; 501/20; 106/1.14
[58] Field of Search ............... 501/41, 19, 20, 17; 106/1.14

[56] References Cited

U.S. PATENT DOCUMENTS

| | | | |
|---|---|---|---|
| 3,798,114 | 5/1974 | Chvatal | 428/433 |
| 3,853,568 | 12/1974 | Chvatal | 501/41 |
| 4,401,767 | 8/1983 | Dietz et al. | 501/19 |
| 4,636,254 | 1/1987 | Husson, Jr. et al. | 106/1.14 |
| 4,743,302 | 5/1988 | Dumesnil et al. | 106/1.23 |
| 4,761,224 | 8/1988 | Husson, Jr. et al. | 106/1.14 |
| 4,933,030 | 6/1990 | Dietz | 106/1.14 |
| 4,945,071 | 7/1990 | Friesen et al. | 501/41 |
| 4,996,171 | 2/1991 | Davey et al. | 501/19 |
| 4,997,718 | 5/1991 | Dumesnil et al. | 501/17 |
| 5,013,360 | 5/1991 | Finkelstein et al. | 501/41 |
| 5,013,697 | 5/1991 | Akhtar | 501/46 |

FOREIGN PATENT DOCUMENTS 9015072 7/1991 European Pat. Off. .

Primary Examiner—Mark L. Bell
Assistant Examiner—Deborah Jones
Attorney, Agent, or Firm—Thomas P. Liniak

[57] ABSTRACT

A glass composition and method of use having unique crystallization and crystal remelt properties is disclosed. The glass composition consists essentially by weight percent on an oxide basis:

about 40–65% $Ag_2O$
about 15–35% $V_2O_5$
about 0–30% $PbO_2$
about 0–20% $TeO_2$ The present invention also contemplates a unique, essentially resin-free organic system that utilizes the novel glass composition described above.

18 Claims, 2 Drawing Sheets

5,334,558

LOW TEMPERATURE GLASS WITH IMPROVED THERMAL STRESS PROPERTIES AND METHOD OF USE

TECHNICAL FIELD

This invention relates to a novel design of low temperature glasses, namely low temperature crystallizing glasses with low temperature crystal remelts, which allow low temperature bonding of the glass, particularly to ceramic substrates commonly used in the electronics industry and methods of forming the same. The final crystallized form of the glass after processing also has significant advantages over vitreous glasses, particularly in the applications of bonding semiconductor devices to ceramic substrates and in the application of low temperature sealing glasses.

BACKGROUND OF THE INVENTION

As related in U.S. Pat. No. 4,933,030 by the same applicant as the present application, a low temperature glass was developed which overcame many of the limitations of the then-existing glass compositions used in Ag/glass die-attach industry. The teachings of the '030 patent are incorporated herein by reference. "Ag/glass" refers to loading a glass with an Ag powder and a suitable organic to make a "paste" which, when applied under an integrated circuit device and correctly processed, will create the required electrical, mechanical, and thermal properties of the resultant assembly. To summarize, the technical advances accomplished by the invention described in U.S. Pat. No. 4,933,030 are:

1. Reduction of the high processing temperatures required to generate adequate adhesion of a die to an integrated circuit package. The performance and yield of high density integrated circuit devices are impaired by high (generally >400° C.) processing temperatures. The capability of attaching these temperature-sensitive devices at lower temperatures (e.g. less than 350° C.) was shown to be very beneficial to the user.

2. Increased reliability and decreased processing of the ceramic packages which house the temperature-sensitive integrated circuit devices. Performing the die-attach process at a temperature less than 350° C. eliminates or greatly reduces the oxidation of the nickel plating under the Au plating as compared to processing at 400°–450° C., the required temperature for prior art lead-borate based Ag/glass system. When processed at 400°–450° C., an additional forming gas process step is generally required to reduce the nickel oxide and achieve adequate wetting of the AuSn pre-forms used to hermetically seal the device in its ceramic package. This improved hermetic yield and the elimination of a costly process step was made possible by the introduction of the product described in U.S. Pat. No. 4,933,030.

3. Elimination of a resin material as part of the organics in a Ag/glass. Prior to the product described in U.S. Pat. No. 4,933,030, Ag/glass compositions always employed the use of a resin to give the paste the proper rheology for applying the Ag/glass material with an automated dispenser, as well as the suspension power and stability of the paste. These resins, typically acrylic in nature, had two major disadvantages when present in any significant amount in an Ag/glass: (1) They were known to retain moisture which contributes to the "residual" moisture sealed in the package. This residual moisture has been shown to significantly and adversely impact the reliability of the final hermetically sealed device; and (2) The resins all have relatively high temperature burn-out properties, typically greater than 300° C. The evolution of the burn-out gases requires a controlled ramp in temperature during the die-attach process to prevent lifting the die, separating it from the Ag/glass adhesive, and causing catastrophic adhesion failures. Thus, the invention described in U.S. Pat. No. 4,933,030 eliminated the resin, thereby reducing the moisture levels, as well as making possible much faster processing during the die-attach cycle.

The invention described in U.S. Pat. No. 4,933,030 did, in fact, overcome many obstacles of the then-existing art, namely, increasing the device and package reliability and significantly reducing the assembly costs by eliminating the separate drying and forming gas clean-up cycle. However, it did leave room for improvement. Although an important advance in other respects, the $Tl_2O_3/V_2O_5/P_2O_5$ glass described in U.S. Pat. No. 4,933,030 did not have the thermal cycling resistance of the established Pb-Borate glass system. Finished devices that utilize these glasses are often subjected to long-term thermal cycling. When parts were cycled from −65° to 150° C. (Mil Std 883, Condition C) for 1000 cycles, the adhesion would substantially decrease in value as a result of the thermal cycling stress. Although the resultant adhesion values would pass Mil Std 883 requirements, they were significantly lower than the values generated by the higher temperature Ag/glass systems.

Various attempts have been made in the prior art to develop glass compositions that are both capable of processing at low temperature (Glass transition temperature, Tg, less than 250° C.) and that have high thermal stress resistance, especially when they are incorporated in Ag/glass compositions. Unfortunately, and generally speaking, as the Tg of a glass is reduced, the thermal expansion is increased making it very difficult to achieve a low temperature Ag/glass with high thermal stress resistance because of the large mismatch of expansion between the silicon semiconductor device ($\approx$3 ppm/C) and the low temperature glass which inherently has a very high expansion (15-25 ppm/C). The glass described in U.S. Pat. No. 4,933,030 offers the lowest temperature processing capabilities (processing as low as 300°–325° C.), but does show adhesion degradation of greater than 50% when subjected to the 1000 cycles, condition C of Mil Std 883 (−65° C. to 150° C.).

On the other hand, JMI's Pb-Borate Ag/glass described in U.S. Pat. No. 4,401,767 shows minimum degradation when subjected to the same thermal cycling test, but has a high Tg of $\approx$325° C. which necessitates processing the Ag/glass at temperatures greater than 400° C. Thus, it is apparent that there exists a large need in the art for a glass, paste, and method of use which overcomes the above-described problems and gives both a low processing temperature and improved properties, most especially the thermal stress resistance of the existing low temperature systems. The present invention describes a novel approach in the glass design and method of forming that will accomplish these goals.

The prior art (including U.S. Pat. No. 4,933,030) historically speaks of the need to utilize bonds having a glass structure that is substantially non-crystalline, since crystallization of a glass during the processing increases the viscosity and impedes the wetting of the glass to an underlying substrate. For this reason, all the present Ag/glass compositions in the marketplace utilize essentially vitreous glasses, e.g. JMI's Pb-Borate glass described in U.S. Pat. No. 4,401,767; their PbO-$V_2O_5$-Phosphate glass described in U.S. Pat. No. 4,996,171; QMI's Pb-Borate glass described in U.S. Pat. Nos. 4,761,224 and 4,636,254; VLSI's PbO-$V_2O_5$ glasses described in U.S. Pat. Nos. 4,743,302 and 5,013,360 and their $Ag_2O$-$P_2O_5$ glass described in U.S. Pat. No. 4,997,718; and National Starch & Chemical's $Ag_2O$-$V_2O_5$-$TeO_2$-PbO glasses described in U.S. Pat. No. 4,945,071. The present invention discloses a novel discovery of a low temperature crystallizing glass with superior properties, such as thermal stress resistance, compared to an essentially vitreous glass of a similar Tg. The crystallizing glass of the present invention exhibits a low Tg on early (or low temperative) crystallization (Tc) a low temperature remelt of these crystals (Tr) and a significant crystallization during the cool down of the glass as will be more fully explained later.

Friessen et al in U.S. Pat. No. 4,945,071 describes a $TeO_2$/$V_2O_5$/$Ag_2O$/PbO system which is essentially vitreous with a glass transition temperature of about 260° C. The crux of the Friessen invention was to keep any crystallization from occuring. Friessen glasses were designed to have no crystal peak temperature or a crystallization temperature that is beyond the processing temperature of the Ag/glasses he described. Particularly key to keeping the glass essentially vitreous (no crystal peak or a high temperature crystal peak) was the addition of PbO as described in Column 5. Also, as will be discussed later in more detail, this oxide state of Pb is not the preferred state for the present invention.

Aside from an entirely different composition, the present invention has several significant distinctions from the above described art. Most significant is that the new glass system of the present invention is based on the fact that a very low temperature crystallization is promoted, rather than prevented along with a very low temperature remelt of these crystals. Furthermore, the crystals remelting create a much lower viscosity glass at a lower temperature than the Friessen glasses and, furthermore, allow processing of semiconductors at substantially lower temperatures ($\approx 100°$ C. lower) while still creating the necessary adhesion along with the associated advantages heretofore described. Unlike the Friessen glasses, the glasses of the present invention end up largely crystallized in the final processed form when cooled, which is considered essential for low temperature glasses to exhibit the desired properties (e.g. thermal cycle endurance) as will be described in detail later.

Likewise, other glass compositions do not teach or suggest the glasses and properties of the present invention. For example, Dumesnil and Finkelstein in U.S. Pat. No. 4,997,718 describe a high $Ag_2O$ glass composition, including mostly $P_2O_5$ and $B_2O_3$, as the balance of the composition. These glasses are essentially vitreous, water soluble with high expansion, and fairly low Tg, about 250° C.

Chvatal, in U.S. Pat. Nos. 3,798,114 and 3,853,568, describes high $Ag_2O$ low temperature glasses that are essentially vitreous, some of which contain combinations of $Ag_2O$, $V_2O_5$ and $TeO_2$. Chvatal teaches the use of $AgNO_3$ as a required batch material for $Ag_2O$. The Chvatal patents do not teach the effectiveness of these glass compositions in a Ag/glass die-attach paste, nor do they teach a partially crystalline finished structure or the potential benefits thereof.

Akhtar in U.S. Pat. No. 5,013,697 and Dumesnil and Finkelstein in U.S. Pat. No. 4,743,302 describe sealing glasses, comprising the PbO/$V_2O_5$ binary with a combination of other oxides, and low expansion ceramic fillers to produce a series of low melting vitreous sealing glasses.

The present invention is based on the discovery that glasses can be designed to crystallize at low temperature with an accompanying low temperature remelt of that crystal. The resulting glasses, when incorporated in Ag/glasses, will bond at a lower temperature like the $Tl_2O_3$/$V_2O_5$/$P_2O_5$ glasses defined in the U.S. Pat. No. 4,933,030, but with marked improvement in properties, especially in thermal stress resistance and chemical durability. These new glasses are characterized by low Tg's (about 250° C. or less), low-temperature crystal formation (about 300° C. or less), a low temperature remelt of these crystals (about 350° C. or less) and a crystalline fired structure with excellent stability after processing.

One of the key results attributed to the present invention is the controlled crystallinity of the finished glass so as to provide a fired glass/ceramic when processed as an Ag/glass paste for die-attach. The controlled crystallization of the fired glassy structure greatly contributes to providing the high adhesions of the die-attach and the resistance to degradation when thermal-cycled, as will be described in detail later. It is believed that the in-situ crystallization provides crystal sites that prevent the propagation of fractures occurring at the silicon die/Ag-glass interface as will be discussed later in detail. There is a large mismatch in expansion between silicon ($\approx 3$ ppm/C) and low temperature glasses, generally 15-25 ppm/C. As noted earlier, as the temperature properties of a glass are decreased, the expansion coefficient increases creating a need for a partially crystallized structure that provides the resistance to thermal cycling degradation.

Heretofore, one of the major problems of low temperature die-attach materials has been the relatively poor thermal stress resistance, compared to the higher ($>400°$ C.) temperature materials. This invention will describe in detail how the newly disclosed glass system and method overcome the deficiency in thermal stress resistance while retaining the low temperature processing. The addition of low thermal expansion oxides, of about 1-25% by weight, to the novel glass composition for purposes of further improving the the final stress-resistance, and for using the combination as a sealing glass or as an insulating material, is also considered part of this invention as will be disclosed later in detail.

SUMMARY OF THE INVENTION

It is apparent from the above, that there exists a need in the art for a new glass composition, paste and method of use which possess significant improvements over the prior art systems. It is an object of the present invention to fulfill these and other needs in the art. Generally speaking, this invention fulfills the above-described needs by providing a glass composition having:

1) a glass transition (Tg) temperature of about 250° C. or less, preferably 200° C. or less, or most preferably about 150° C.

2) a crystallization temperature (Tc) of about 300° C. or less, preferably less than 250° C., or most preferably about 200° C.

3) a crystal remelt temperature (Tr) of less than about 350° C., preferably less than 300° C., or most preferably about 275° C.

One glass system that possesses these essential glass properties consists essentially by weight percent on an oxide basis:
- about 40-65% $Ag_2O$
- about 15-35% $V_2O_5$
- about 0-30% $PbO_2$
- about 0-20% $TeO_2$ The present invention also contemplates a unique, essentially resin-free organic system that utilizes the novel glass composition described above. That organic system also comprises a combination of aromatic and/or aliphatic solvents of low functionality in combination with a very slight amount of resin, such as Hercules EHEC ethyl cellulose, to optimize the rheology of the paste for dispensing. This organic system allows rapid processing of large die without creating voids.

Such pastes, furthermore, find unique applicability when attaching electronic components to a ceramic. For this reason, this invention contemplates within its scope an improved method of attaching an electronic component, such as an integrated circuit silicon die, to a ceramic (substrate). The method includes applying an Ag/glass paste of this invention as a bonding agent between the parts to be bonded into a package, and heating the package to a temperature for a time sufficient to fuse the glass, thereby to bond the device to the ceramic and thereafter cooling the package to room temperature.

In the preferred embodiments the paste includes silver flake, the resulting bond is a partially crystalline glass ceramic, and has a moisture content in a final sealed package significantly below 5000 ppm. Several objects of this invention are evident from the above.

One object of the present invention is to provide low temperature glasses of good fluidity at low temperatures and that partially crystallize when allowed to cool to room temperature.

A further object of the present invention is to provide a silver/glass die-attach material that incorporates the above glasses making possible the inorganic attaching of semiconductor devices at both low and high temperatures (e.g. less than or greater than 350° C.) and exhibiting improved thermal cycling resistance properties over the silver/glass die attach material described in U.S. Pat. No. 4,933,030.

A further object of the invention is to provide a silver/glass paste without the use of any substantial amount of resins that gives superior dispensing properties and faster processing in the application of the present invention without creating voids, or retaining insignificant amounts of moisture.

A further object of the present invention is to provide a method, by using above glasses and loading with a metal, for attaching semiconductor devices at a temperature below 350° C.

A still further object of the present invention is to provide an Ag-filled glass that will significantly minimize residual stress (thermally induced) in the die, particularly when larger dies are packaged.

A still further object of the present invention is to provide a low temperature sealing glass composition that will hermetically seal package parts together. This would include low expansion refractory fillers as described herein.

A still further object of the present invention is to provide an electrically insulating composition of high thermal properties to attach semiconductor or passive devices in a package, utilizing the unique glass of the present invention.

It is an object of the present invention to fulfill these and other needs in the art which will become apparent to the skilled artisan once given the following disclosure. The present invention will now be described, with respect to certain embodiments thereof, in association with the accompanying drawings, wherein:

DETAILED DESCRIPTION OF CERTAIN EMBODIMENTS OF THE INVENTION

The glass compositions of the present invention have a wide field of use. Of particular importance and, thus, as the preferred environment for use of these glass compositions, is the art of bonding an electronic device to a ceramic. Particularly preferred usage in this respect is where an integrated circuit silicon die is to be bonded to a ceramic substrate, and the glass compositions of the present invention form the glass material in a paste, which further includes a solvent or combination of solvents with an optionally small amount of resin, and preferably with an additive powder, particularly particles of silver (Ag). Such a paste is generally referred to as an Ag/glass die-attach paste.

Figure 1:
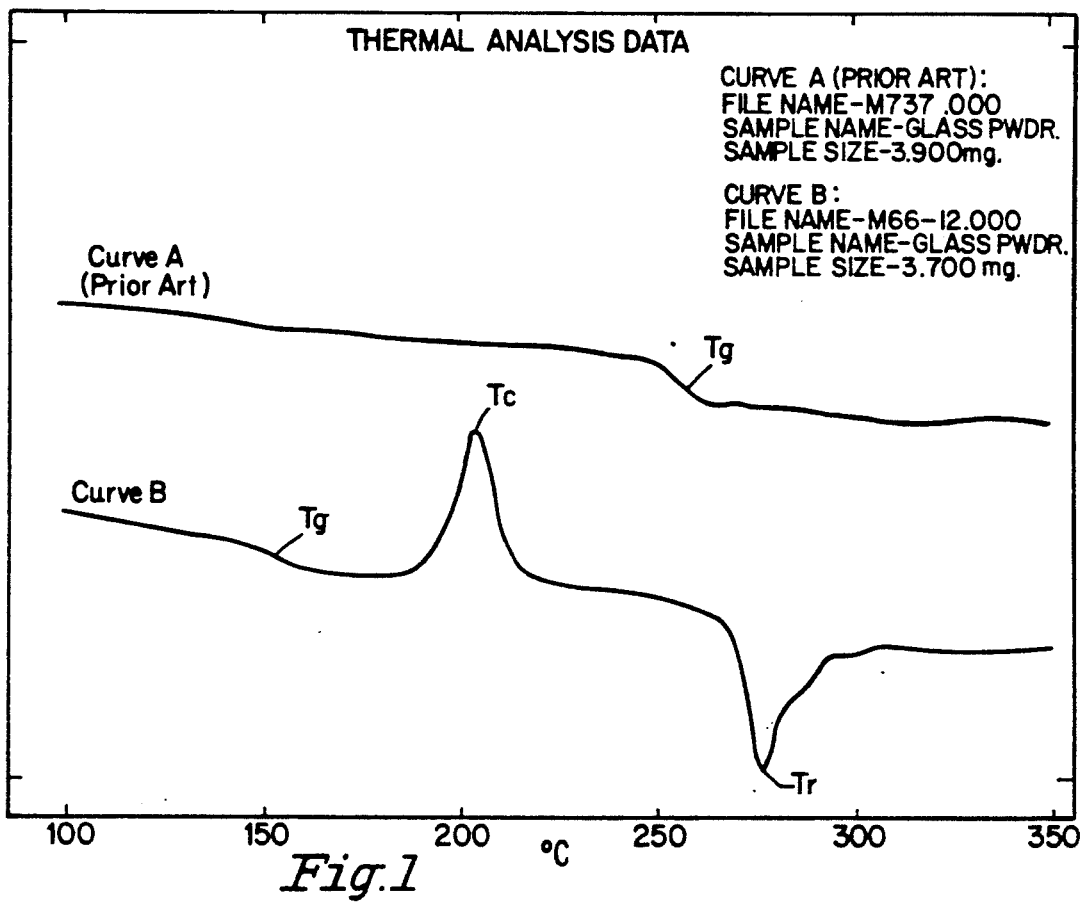
FIG. 1 is a thermal analysis plot showing the difference in glass properties of the prior art compared to the new invention.

Most of the characteristics of the present invention can be illustrated graphically with reference to FIG. 1 which shows the key differences in glass properties between prior art compositions and those of the present invention. FIG. 1 represents a Thermal analysis plot by a Differential Scanning Calorimeter (DSC). By heating a small sample of the glass powder, the change in energy is measured in the vertical axis against temperature on the x-axis. Glasses exemplary of the current state-of-the-art in glass properties are illustrated by curve A. The first small change in energy level is known as the glass transition temperature (Tg) where the glass changes from a solid is a more plastic structure free of stress. For example, the glasses described by Friessen in U.S. Pat. No. 4,945,071 and Dumesnil in U.S. Pat. No. 4,743,302 are examples of glasses whose DSC is depicted in Curve A. There also exists glass with a similar DSC but with high Tg ($\approx 300$ C.) e.g. JMI's glass described in U.S. Pat. No. 4,701,767 and Diemat's glass described in U.S. Pat. No. 4,933,030 with a much lower Tg ($\approx 150$ C).

As glasses of the type illustrated by curve A (FIG. 1) are heated, the viscosity of the glass decreases in viscosity until low enough to wet the surfaces to be bonded and form an adhesive bond. Generally, the temperature required to reach this required low viscosity would be at least 100°-150° C. higher than the Tg. Upon cooling the viscosity increases gradually until reaching a maximum at the Tg. As indicated earlier, the lower the Tg, the higher the expansion of the glass in the final assembly. Thus, when the assembly is subsequently thermal cycled, the large expansion mismatch creates microcracks in the glassy structure and degrades the adhesion of the silicon die to the substrate as discussed earlier.

The DSC plot depicted in Curve B represents a glass of the new invention. This glass has a low Tg of $\approx 150°$ C. Upon further heating the glass crystallizes at about 200° C., (Tc) showing an exotherm on the DSC plot. The teachings of the prior art normally considered this crystallization (exotherm) an undesirable reaction since the viscosity of the glass increases sharply inhibiting any wetting of the glass to the interface at the die and substrate. However, further heating of the crystallized structure creates a remelt (Tr) of the initially formed crystals at a very low temperature of about 275° C. This endothermic reaction of remelting the crystals is key to this invention since the glass now abruptly changes to a low viscosity state which allows the glass to wet the interfaces and create a strong bond. Further heating of the assembly has no detrimental impact and can be heated as high as 450° C. or higher without adverse effects.

As the die/Ag glass/substrate assembly is cooled, another key reaction occurs, namely the recrystallization of the amorphous glass at about 200° C. again. This can be detected, although not shown, as another exothermic peak on the DSC curve. The recrystallization during the cool down is key to the thermal stress resistance of the present invention, as will be described later. The degree of crystallizing and remelting can be measured by the energy under the curve and expressed in units of joules/gm. The present invention, therefore, teaches a glass composition that will have the thermal reactions described in Curve B of FIG. 1, namely a low Tg, an early crystallization (Tc), a low temperature remelt (Tr) of these crystals, and a recrystallization during the cool down.

The glass compositions of the present invention are based on an $Ag_2O$ and $V_2O_5$ ratio near the eutectic composition which yields low temperature properties. However, excessive and uncontrolled crystallization occurs with this binary eutectic composition. The crystallinity can be controlled by specific combinations of glass formers along with process parameters. $TeO_2$ and $PbO_2$ or $Pb_3O_4$ appear to serve as the primary stabilizing agents and, hence, if too much is used, little crystallinity is possible, as in the prior art Friessen glasses; or, if an insufficient amount is used, excessive crystallization will occur with a relatively high remelt temperature, causing poor adhesion due to the lack of sufficient glassy phase present to wet the interfaces for good adhesion at lower temperatures. Thus, an optimum amount and combination of $TeO_2$ and $PbO_2$ provide a glass possessing the low temperature properties along with the desired crystallinity of the finished structure. The novel glass compositions of the present invention consist essentially of, by weight in an oxide basis:

about 40–65% $Ag_2O$
about 15–35% $V_2O_5$
about 0–20% $TeO_2$
about 0–30% $PbO_2$ Preferably, they consist essentially of, by weight on an oxide basis:

about 40–50% $Ag_2O$
about 15–25% $V_2O_5$
about 5–15% $TeO_2$
about 10–25% $PbO_2$ These glasses all form stable vitreous glasses during the melting process, but upon refiring, have different amounts of crystallinity present in the final structure. It is important to note that the amount of crystallinity enabled by the selection and percentage of components present in the glass composition, according to the present invention, is controlled, such that it falls within a preferred range which is substantially less than 100%. The amount of crystallinity present in the final glass structure is dependent primarily upon the specific ratios of the components of the glass composition and the melting process parameters used. The amount of crystallinity, as stated earlier, is the key to the adhesion as illustrated below.

TABLE I

| Melt # | $Ag_2O$ | $V_2O_5$ | $TeO_2$ | $PbO_2$ | Tg (1) | Crystallinity (2) | Adhesion (3) |
|---|---|---|---|---|---|---|---|
| M337 | 65 | 20 | 15 | | 140 | <5% | 102 |
| M353 | 61.6 | 22 | 16.4 | | 140 | 20% | 162 |
| M354 | 58.9 | 23.5 | 17.6 | | 145 | 50% | 176 |
| M355 | 55.7 | 25.3 | 19 | | 150 | 70% | 180 |
| M666 | 46.9 | 22.0 | 8.9 | 22.2 | 155 | 70% | 150 |
| M356 | 53.3 | 26.7 | 20 | | 155 | 80% | 174 |
| M370 | 60.5 | 27.5 | 12 | | 135 | 85% | 101 |
| M206 | 60 | 30 | 10 | | 135 | 90% | 76 |
| M572 | 68 | 32 | — | | 126 | 98% | 0 |

(1) Glass transition temperature as defined earlier.
(2) Refers to approximate amount of crytallinity present in the fired structure as determined analytically by methods described below. Glass pastes of M337, M355, M370, M206 were applied to bare alumina ($Al_2O_3$) substrates and processed at a peak temperature of 350° C. These samples were then analyzed by X-ray diffraction (XRD) which displays the number of counts per second for each crystalline phase. The height of the crystal peaks, compared to the amorphous backgrou nd scatter, gives a quantitative comparison of the amount of a crystallinity of the different glasses. Each of the four glasses was also potted, sectioned and polished. The sections were analyzed by a scanning electron microscope (SEM) using the backscatter emission mode which gives a photograph of the glass section. At a magnification of 1000X, the crystals and glassy (vitreous) phases could be clearly distinguished. Estimating the area of each phase and comparing it with the XRD results gave a relatively accurate quantitative degree of crystallization of the various glasses. The DSC curves also provide a semi-quantitative measure of crystallization by the amount of energy/units or area render the exothermic crystallization peak (enthalpy value) and the corresponding endothermic energy noted during the remelting of the crystals. Once a reference has been established, one can approximate the percent of crystallization for other glasses (Table IIIinfra) simply by comparison to the known standard generated by this series of testing.
(3) Adhesion of a .338 × .338 die processed at 350° C. on bare alumina substrates. Adhesion was measured by a Sebastion III stud pull tester, as described in U.S. Pat. No. 4,933,030.

crystallization for other glasses (Table III infra) simply by comparison to the known standard generated by this series of testing. (3) Adhesion of a 0.338×0.338 die processed at 350° C. on bare alumina substrates. Adhesion was measured by a Sebastion III stud pull tester, as described in U.S. Pat. No. 4,933,030.

A particularly preferred glass composition, for use in a AG/glass die-attach paste exhibiting superior adhesion at tow temperatures and thermal cycling properties, consisted essentially of:

about 47% $Ag_2O$
about 22% $V_2O_5$
about 9% $TeO_2$
about 22% $PbO_2$ hereafter referred to as example M666.

The M666 preferred composition, when used in a Ag/glass paste and processed in accordance with the present invention, had not only unexpectedly high adhesions, but possessed other significant advantages. Most importantly, the thermal-cycled adhesion values did not degrade significantly as compared to the preferred glass, example M44 of U.S. Pat. No. 4,933,030, as shown below.

TABLE II

| Glass Melt | Glassy Edge Temp. | Degree of Crystallinity | Initial Adhesion (1) | After 1000 T/C (2) |
|---|---|---|---|---|
| M44 | 210 | none | 115 | 32–28% |

TABLE II-continued

| Glass Melt | Glassy Edge Temp. | Degree of Crystallinity | Initial Adhesion (1) | After 1000 T/C (2) |
|---|---|---|---|---|
| M666 | 205 | 70% | 140 | 89–64% |

(1) .338" × .338" die processed @ 350° C. (in pounds.)
(2) Initial adhesion in pounds and % retention of initial adhesion after 1000 temp cycles per Mil Std 883, Condition C.

The expansion of the M44 glass is about 23 ppm/c, whereas the expansion of the M666 glass is about 19 ppm/c. The lower expansion glass is preferable because it is a closer expansion match to the silicon die which is about 3 ppm/c. However, the mismatch in expansion is still very wide and therefore the somewhat lower expansion alone doesn't explain the higher initial adhesions accompanied by a high retained adhesion after thermal cycling.

This vast improvement in properties is in large measure attributed to the controlled amount of crystallinity present in the fired glass. It is postulated that the crystal sites not only strengthen the glassy structure, but also prevent propagation of microcracks caused by the mismatch in expansion of the glass and the silicon die. In contrast, upon temperature cycling with vitreous glasses, these initial microcracks continue to propagate and weaken the entire assembly. The partially crystallized glass, on the other hand, possesses crystal sites which serve to prevent the microcracks from growing.

The crystal sites are believed to be a complicated $Ag_2O$-$V_2O_5$-$TeO_2$-$PbO_2$ crystal with specific stoichiometric ratios. This phenomenon is thought to be largely responsible for the high retention of adhesion after temperature cycling.

The formulation of the glasses of the present invention is accomplished in a fashion, similar to that described in detail in U.S. Pat. No. 4,933,030 and those procedures are incorporated herein by reference. Although $Ag_2O$, $V_2O_5$, $PbO_2$ and $TeO_2$ are the four preferred ingredients of glass, it is recognized that combinations other than these may accomplish similar glass properties, namely appropriate Tg, Tc & Tr temperatures and are considered part of the present invention. It is recognized that many other ingredients may be added to the basic formulation in various amounts, and these are also considered to be within the scope of the present invention. Generally speaking, additions in amounts of other materials greater than about 10% tend to adversely alter the properties of the glass, although this is not always true, $Tl_2O_3$.

The following examples are shown (See Table III) to illustrate how the preferred ranges were determined, as well as the various additives that were employed, such as $P_2O_5$, $Tl_2O_3$, $Bi_2O_3$, CuO or $Cu_2O$, $B_2O_3$, $MnO_2$, PbO, $Pb_3O_4$, $SnO_2$, $Ta_2O_5$, $Nb_2O_5$, $Y_2O_3$, $SiO_2$, $Al_2O_2$, and $WO_3$.

TABLE III

| MELT | M206 | M217 | M219 | M337 | M353 | M354 | M355 | M356 |
|---|---|---|---|---|---|---|---|---|
| Ag2O | 60.0 | 67.5 | 62.5 | 65.0 | 61.6 | 58.9 | 55.7 | 53.3 |
| V2O5 | 30.0 | 20.0 | 25.0 | 20.0 | 22.0 | 23.5 | 25.3 | 26.7 |
| TeO2 | 10.0 | 12.5 | 12.5 | 15.0 | 16.4 | 17.6 | 19.0 | 20.0 |
| PbO2 | | | | | | | | |
| MoO3 | | | | | | | | |
| Pb3O4 | | | | | | | | |
| Tl2O3 | | | | | | | | |
| PbO | | | | | | | | |
| P2O5 | | | | | | | | |
| SeO2 | | | | | | | | |
| CuO | | | | | | | | |
| B2O3 | | | | | | | | |
| ZnO | | | | | | | | |
| WO3 | | | | | | | | |
| SiO2 | | | | | | | | |
| TOTAL % | 100.0 | 100.0 | 100.0 | 100.0 | 100.0 | 100.0 | 100.0 | 100.0 |
| Tg(C) | | 127 | 138 | | 139 | | 151 | |
| Tc1(C) | | 192 | 190 | | 195 | | 264 | |
| Tc2(C) | | — | 266 | | 276 | | 211 | |
| Tc3(C) | | — | 315 | | — | | 225 | |
| Tr1(C) | | 300 | 300 | | 299 | | 315 | |
| Tr2(C) | | — | 262 | | 332 | | 333 | |
| Tr3(C) | | — | — | | — | | | |

| MELT | M370 | M487 | M493 | M501 | M507 | M510 | M515 | M521 |
|---|---|---|---|---|---|---|---|---|
| Ag2O | 60.5 | 13.7 | 49.0 | 17.1 | | 36.8 | 50.6 | 34.0 |
| V2O5 | 27.5 | 24.4 | 22.3 | 26.8 | 26 | 13.7 | 23 | 19.0 |
| TeO2 | 12.0 | 14.1 | 16.7 | 28.2 | 64 | 2.1 | 17.3 | 2.0 |
| PbO2 | | | | | | | | |
| MoO3 | | | | | 10 | | | |
| Pb3O4 | | | | | | | | |
| Tl2O3 | | 47.8 | | 27.9 | | 36.8 | 7.9 | 35.0 |
| PbO | | | | | | | | |
| P2O5 | | | 8.0 | | | 10.5 | 1.2 | 10.0 |
| SeO2 | | | 4.0 | | | | | |
| CuO | | | | | | | | |
| B2O3 | | | | | | | | |
| ZnO | | | | | | | | |
| WO3 | | | | | | | | |
| SiO2 | | | | | | | | |
| TOTAL % | 100.0 | 100.0 | 100.0 | 100.0 | 100.0 | 99.9 | 100.0 | 100.0 |
| Tg(C) | | 128 | 204 | 179 | | | | |
| Tc1(C) | | 205 | 312 | 276 | | | | |
| Tc2(C) | | — | 353 | 353 | | | | |
| Tc3(C) | | — | — | — | | | | |
| Tr1(C) | | 300 | — | 314 | | | | |

TABLE III-continued

| | | | | | | | |
|---|---|---|---|---|---|---|---|
| Tr2(C) | — | — | — | | | | |
| Tr3(C) | — | — | — | | | | |

| MELT | M531 | M539 | M548 | M549 | M553 | M554 | M571 | M573 |
|---|---|---|---|---|---|---|---|---|
| Ag2O | 58.0 | 54.3 | 56.5 | 62.7 | 65.2 | 63.5 | 59.5 | 68.0 |
| V2O5 | 23.0 | 24.7 | 20.9 | 23.3 | 22.4 | 21.9 | 34.9 | 32.0 |
| TeO2 | 19.0 | 18.5 | 18.1 | 14.0 | 12.4 | 14.6 | 5.6 | |
| PbO2 | | | | | | | | |
| MoO3 | | | | | | | | |
| Pb3O4 | | | | | | | | |
| Tl2O3 | | 2 | 4.0 | | | | | |
| PbO | | | | | | | | |
| P2O5 | | 0.5 | 0.5 | | | | | |
| SeO2 | | | | | | | | |
| CuO | | | | | | | | |
| B2O3 | | | | | | | | |
| ZnO | | | | | | | | |
| WO3 | | | | | | | | |
| SiO2 | | | | | | | | |
| TOTAL % | 100.0 | 100.0 | 100.0 | 100.0 | 100.0 | 100.0 | 100.0 | 100.0 |
| Tg(C) | 144 | | 135 | 138 | 129 | | | 126 |
| Tc1(C) | 200 | | 203 | 193 | 188 | | | 152 |
| Tc2(C) | 269 | | 270 | 273 | 266 | | | 199 |
| Tc3(C) | — | | — | — | — | | | 266 |
| Tr1(C) | 336 | | 299 | 302 | 304 | | | 355 |
| Tr2(C) | 329 | | 311 | 323 | — | | 328 | |
| Tr3(C) | 317 | | — | — | — | | | — |

| MELT | M575 | M576 | M578 | M580 | M582 | M583 | M585 | M586 |
|---|---|---|---|---|---|---|---|---|
| Ag2O | 64.6 | 64.2 | 62.4 | 64.9 | 66.1 | 66 | 62.4 | 58.5 |
| V2O5 | 30.4 | 30.2 | 29.3 | 30.5 | 31.1 | 31.1 | 29.4 | 27.5 |
| TeO2 | | 5.6 | | | | | | 5.6 |
| PbO2 | | | 8.3 | | | | | 8.4 |
| MoO3 | | | | | | | | |
| Pb3O4 | | | | | | | | |
| Tl2O3 | | | | | | | | |
| PbO | | | | | | | | |
| P2O5 | 5 | | | | | | | |
| SeO2 | | | | | 2.8 | | | |
| CuO | | | | 3.2 | | | | |
| B2O3 | | | | | | 2.9 | | |
| ZnO | | | | | | | | |
| WO3 | | | | | | | 8.2 | |
| SiO2 | | | | 1.4 | | | | |
| TOTAL % | 100.0 | 100.0 | 100.0 | 100.0 | 100.0 | 100.0 | 100.0 | 100.0 |
| Tg(C) | 151 | 134 | 125 | | | 131 | | 134 |
| Tc1(C) | 181 | 167 | 160 | | | 175 | | 194 |
| Tc2(C) | 281 | — | 300 | | | — | | 209 |
| Tc3(C) | — | — | — | | | — | | 318 |
| Tr1(C) | — | 301 | 354 | | | 360 | | 275 |
| Tr2(C) | — | 341 | — | | | — | | 335 |
| Tr3(C) | — | 255 | — | | | — | | 292 |

| MELT | M589 | M590 | M600 | M601 | M602 | M603 | M604 | M605 |
|---|---|---|---|---|---|---|---|---|
| Ag2O | 57.8 | 59.0 | 61.9 | 51.8 | 49.4 | 54.8 | 52.6 | 49.9 |
| V2O5 | 27.2 | 27.7 | 29.1 | 24.3 | 23.3 | 25.8 | 24.7 | 23.4 |
| TeO2 | 3.8 | 7.6 | 6.0 | 12.3 | 15.6 | 12.4 | 15.7 | 10.7 |
| PbO2 | 11.2 | 5.7 | | 11.6 | 11.7 | 7.0 | 7.0 | 16.0 |
| MoO3 | | | | | | | | |
| Pb3O4 | | | | | | | | |
| Tl2O3 | | | | | | | | |
| PbO | | | | | | | | |
| P2O5 | | | | | | | | |
| SeO2 | | | | | | | | |
| CuO | | | 3.0 | | | | | |
| B2O3 | | | | | | | | |
| ZnO | | | | | | | | |
| WO3 | | | | | | | | |
| SiO2 | | | | | | | | |
| TOTAL % | 100.0 | 100.0 | 100.0 | 100.0 | 100.0 | 100.0 | 100.0 | 100.0 |
| Tg(C) | 133 | 133 | 140 | 146 | 153 | 141 | 149 | 153 |
| Tc1(C) | 184 | 207 | 200 | 245 | 348 | 216 | 276 | 221 |
| Tc2(C) | 195 | 321 | — | 225 | 285 | 329 | 214 | 249 |
| Tc3(C) | 320 | 277 | — | 286 | 225 | 278 | 237 | — |
| Tr1(C) | 347 | 292 | 332 | 274 | 276 | 271 | 311 | 273 |
| Tr2(C) | 281 | — | 317 | 300 | 309 | 302 | 305 | — |
| Tr3(C) | 315 | — | — | — | — | — | — | — |

| MELT | M606 | M607 | M608 | M609 | M610 | M611 | M612 | M613 |
|---|---|---|---|---|---|---|---|---|
| Ag2O | 55.9 | 54.3 | 49.1 | 46.9 | 45.7 | 42.8 | 48.7 | 49.9 |
| V2O5 | 25.1 | 26.7 | 23.1 | 22.0 | 21.5 | 20.1 | 22.9 | 23.4 |
| TeO2 | 7.6 | 7.6 | 7.5 | 10.6 | 12.2 | 12.1 | 12.3 | 10.7 |

TABLE III-continued

| | | | | | | | | |
|---|---|---|---|---|---|---|---|---|
| PbO2 | 11.4 | 11.4 | 20.3 | 20.5 | 20.6 | 25.0 | 16.1 | 16.0 |
| MoO3 | | | | | | | | |
| Pb3O4 | | | | | | | | |
| Tl2O3 | | | | | | | | |
| PbO | | | | | | | | |
| P2O5 | | | | | | | | |
| SeO2 | | | | | | | | |
| CuO | | | | | | | | |
| B2O3 | | | | | | | | |
| ZnO | | | | | | | | |
| WO3 | | | | | | | | |
| SiO2 | | | | | | | | |
| TOTAL % | 100.0 | 100.0 | 100.0 | 100.0 | 100.0 | 100.0 | 100.0 | 100.0 |
| $T_g$(C) | 141 | 139 | 152 | 155 | 160 | 171 | 156 | 151 |
| $T_{c1}$(C) | 343 | 211 | 198 | 208 | 228 | 236 | 232 | 226 |
| $T_{c2}$(C) | 207 | 323 | — | — | — | 295 | 264 | 248 |
| $T_{c3}$(C) | 225 | — | — | — | — | — | — | — |
| $T_{r1}$(C) | 274 | 272 | 278 | 276 | 282 | 323 | 278 | 274 |
| $T_{r2}$(C) | 294 | 292 | 292 | — | 267 | 275 | — | 300 |
| $T_{r3}$(C) | — | — | — | — | 319 | — | — | — |

| MELT | M614 | M615 | M616 | M617 | M618 | M619 | M620 | M621 |
|---|---|---|---|---|---|---|---|---|
| Ag2O | 51.8 | 47.5 | 48.0 | 46.2 | 47.6 | 47.5 | 46.1 | 50.3 |
| V2O5 | 24.3 | 22.3 | 22.5 | 22.7 | 21.4 | 21.3 | 20.7 | 22.5 |
| TeO2 | 12.3 | 10.8 | 9.1 | 10.6 | 10.6 | 10.7 | 10.6 | 9.1 |
| PbO2 | 11.6 | | 20.4 | 20.5 | 20.4 | | 22.6 | 18.1 |
| MoO3 | | | | | | | | |
| Pb3O4 | | | | | | | | |
| Tl2O3 | | | | | | | | |
| PbO | | 19.4 | | | | 20.5 | | |
| P2O5 | | | | | | | | |
| SeO2 | | | | | | | | |
| CuO | | | | | | | | |
| B2O3 | | | | | | | | |
| ZnO | | | | | | | | |
| WO3 | | | | | | | | |
| SiO2 | | | | | | | | |
| TOTAL % | 100.0 | 100.0 | 100.0 | 100.0 | 100.0 | 100.0 | 100.0 | 100.0 |
| $T_g$(C) | 150 | 155 | 159 | 160 | 163 | 156 | 169 | 156 |
| $T_{c1}$(C) | 245 | 214 | 217 | 230 | 230 | 211 | 235 | 224 |
| $T_{c2}$(C) | — | 234 | 253 | 271 | 300 | 286 | 301 | — |
| $T_{c3}$(C) | — | — | — | — | — | 248 | — | — |
| $T_{r1}$(C) | 274 | 280 | 273 | 280 | 277 | 297 | 325 | 275 |
| $T_{r2}$(C) | 300 | 295 | 294 | 290 | 324 | 279 | 279 | 299 |
| $T_{r3}$(C) | — | 310 | — | 318 | — | 311 | 354 | 321 |

| MELT | M627 | M628 | M629 | M630 | M633 | M634 | M635 | M636 |
|---|---|---|---|---|---|---|---|---|
| Ag2O | 46.9 | 47.5 | 49.2 | 54.5 | 58.0 | 58.0 | 58.0 | 58.0 |
| V2O5 | 22.0 | 22.3 | 23.2 | 25.6 | 23.0 | 23.0 | 23.0 | 23.0 |
| TeO2 | 10.6 | 10.8 | 9.4 | 6.8 | 19.0 | 12.7 | 9.5 | 6.5 |
| PbO2 | 20.5 | | 18.2 | 13.1 | | 6.3 | 9.5 | 12.5 |
| MoO3 | | | | | | | | |
| Pb3O4 | | | | | | | | |
| Tl2O3 | | | | | | | | |
| PbO | | 19.4 | | | | | | |
| P2O5 | | | | | | | | |
| SeO2 | | | | | | | | |
| CuO | | | | | | | | |
| B2O3 | | | | | | | | |
| ZnO | | | | | | | | |
| WO3 | | | | | | | | |
| SiO2 | | | | | | | | |
| TOTAL % | 100.0 | 100.0 | 100.0 | 100.0 | 100.0 | 100.0 | 100.0 | 100.0 |
| $T_g$(C) | 154 | 156 | 148 | 139 | 153 | 134 | 133 | 134 |
| $T_{c1}$(C) | 204 | 215 | 205 | 192 | 268 | 198 | 197 | 178 |
| $T_{c2}$(C) | 236 | 232 | — | 222 | 213 | 271 | — | 188 |
| $T_{c3}$(C) | — | — | — | 337 | — | — | — | 270 |
| $T_{r1}$(C) | 277 | 281 | 276 | 273 | 318 | 294 | 295 | 296 |
| $T_{r2}$(C) | 308 | 295 | 285 | 294 | 328 | 262 | — | — |
| $T_{r3}$(C) | — | 312 | — | 352 | 258 | — | — | — |

| MELT | M637 | M638 | M639 | M640 | M641 | M642 | M643 | M644 |
|---|---|---|---|---|---|---|---|---|
| Ag2O | 53.7 | 49.3 | 57.3 | 58.3 | 58.4 | 65.4 | 58.4 | 59.5 |
| V2O5 | 21.3 | 19.6 | 22.7 | 21.6 | 21.6 | 22.6 | 21.6 | 20.5 |
| TeO2 | 8.5 | 10.6 | 15.0 | 13.4 | 10.0 | 12.0 | 15.0 | 15.0 |
| PbO2 | 16.5 | 20.5 | 5.0 | 6.7 | 10.0 | | 5.0 | 5.0 |
| MoO3 | | | | | | | | |
| Pb3O4 | | | | | | | | |
| Tl2O3 | | | | | | | | |
| PbO | | | | | | | | |
| P2O5 | | | | | | | | |
| SeO2 | | | | | | | | |

TABLE III-continued

| | | | | | | | | |
|---|---|---|---|---|---|---|---|---|
| CuO | | | | | | | | |
| B2O3 | | | | | | | | |
| ZnO | | | | | | | | |
| WO3 | | | | | | | | |
| SiO2 | | | | | | | | |
| TOTAL % | 100.0 | 100.0 | 100.0 | 100.0 | 100.0 | 100.0 | 100.0 | 100.0 |
| Tg(C) | 144 | 153 | 139 | 136 | 138 | 132 | 137 | 136 |
| Tc1(C) | 190 | 197 | 196 | 197 | 199 | 190 | 195 | 196 |
| Tc2(C) | 247 | — | 275 | 264 | 269 | 264 | 265 | 265 |
| Tc3(C) | — | — | — | — | — | — | — | — |
| Tr1(C) | 297 | 296 | 268 | 295 | 297 | 304 | 291 | 298 |
| Tr2(C) | 279 | 277 | 310 | — | — | — | — | — |
| Tr3(C) | — | 258 | 295 | — | — | — | — | — |

| MELT | M645 | M646 | M647 | M648 | M649 | M650 | M651 | M652 |
|---|---|---|---|---|---|---|---|---|
| Ag2O | 62.5 | 66.9 | 68.4 | 64.2 | 70.4 | 66.5 | 68.0 | 68.9 |
| V2O5 | 21.5 | 23.1 | 23.6 | 23.8 | 19.6 | 21.5 | 22.0 | 19.1 |
| TeO2 | 12.0 | 10.0 | 8.0 | 12.0 | 10.0 | 12.0 | 10.0 | 12.0 |
| PbO2 | 4.0 | | | | | | | |
| MoO3 | | | | | | | | |
| Pb3O4 | | | | | | | | |
| Tl2O3 | | | | | | | | |
| PbO | | | | | | | | |
| P2O5 | | | | | | | | |
| SeO2 | | | | | | | | |
| CuO | | | | | | | | |
| B2O3 | | | | | | | | |
| ZnO | | | | | | | | |
| WO3 | | | | | | | | |
| SiO2 | | | | | | | | |
| TOTAL % | 100.0 | 100.0 | 100.0 | 100.0 | 100.0 | 100.0 | 100.0 | 100.0 |
| Tg(C) | 130 | 121 | 121 | 126 | 128 | 124 | 122 | 120 |
| Tc1(C) | 197 | 179 | 318 | 180 | 268 | 191 | 178 | 328 |
| Tc2(C) | 259 | 224 | 178 | 320 | 192 | 250 | 223 | 179 |
| Tc3(C) | — | 257 | 225 | 252 | 167 | — | 250 | — |
| Tr1(C) | 299 | 307 | 305 | 307 | 304 | 300 | 306 | 306 |
| Tr2(C) | — | — | — | — | — | — | — | — |
| Tr3(C) | — | — | — | — | — | — | — | — |

| MELT | M654 | M657 | M658 | M659 | M664 | M665 | M666 | M667 |
|---|---|---|---|---|---|---|---|---|
| Ag2O | 23.8 | 23.3 | 22.8 | 21.6 | 47.3 | 46.9 | 46.9 | 48.7 |
| V2O5 | 20.3 | 19.9 | 19.5 | 18.5 | 23.3 | 22.0 | 22.0 | 22.8 |
| TeO2 | 16.0 | 11.8 | 7.7 | 9.4 | 16.6 | 9.7 | 8.9 | 9.7 |
| PbO2 | | 5.9 | 11.6 | 14.1 | 8.3 | 21.4 | 22.2 | 18.8 |
| MoO3 | | | | | | | | |
| Pb3O4 | | | | | | | | |
| Tl2O3 | 39.9 | 39.1 | 38.4 | 36.4 | 4.5 | | | |
| PbO | | | | | | | | |
| P2O5 | | | | | | | | |
| SeO2 | | | | | | | | |
| CuO | | | | | | | | |
| B2O3 | | | | | | | | |
| ZnO | | | | | | | | |
| WO3 | | | | | | | | |
| SiO2 | | | | | | | | |
| TOTAL % | 100.0 | 100.0 | 100.0 | 100.0 | 100.0 | 100.0 | 100.0 | 100.0 |
| Tg(C) | 125 | 119 | 120 | 130 | 145 | 153 | 155 | 149 |
| Tc1(C) | 207 | 211 | 180 | 202 | 267 | 207 | 207 | 212 |
| Tc2(C) | 224 | 264 | 242 | 259 | 233 | — | — | 225 |
| Tc3(C) | — | — | 286 | 280 | 216 | — | — | — |
| Tr1(C) | 317 | 295 | 298 | 298 | 305 | 275 | 275 | 274 |
| Tr2(C) | — | 305 | 313 | 311 | — | 301 | — | 301 |
| Tr3(C) | — | — | — | — | — | — | — | — |

| MELT | M668 | M669 | M670 | M671 | M672 | M674 | M675 | M676 |
|---|---|---|---|---|---|---|---|---|
| Ag2O | 45.5 | 46.9 | 46.9 | 48.6 | 49.7 | 38.2 | 29.2 | 29.2 |
| V2O5 | 21.4 | 22.0 | 22.0 | 22.8 | 23.3 | 21.8 | 20.3 | 20.3 |
| TeO2 | 11.3 | 10.6 | 8.1 | 8.2 | 7.7 | 12.5 | 18.7 | 12.5 |
| PbO2 | 21.8 | 20.5 | 23.0 | 20.4 | 19.3 | 12.5 | 6.3 | 12.5 |
| MoO3 | | | | | | | | |
| Pb3O4 | | | | | | | | |
| Tl2O3 | | | | | | 15.0 | 25.5 | 25.5 |
| PbO | | | | | | | | |
| P2O5 | | | | | | | | |
| SeO2 | | | | | | | | |
| CuO | | | | | | | | |
| B2O3 | | | | | | | | |
| ZnO | | | | | | | | |
| WO3 | | | | | | | | |
| SiO2 | | | | | | | | |
| TOTAL % | 100.0 | 100.0 | 100.0 | 100.0 | 100.0 | 100.0 | 100.0 | 100.0 |

TABLE III-continued

| | | | | | | | | |
|---|---|---|---|---|---|---|---|---|
| Tg(C) | 156 | 154 | 155 | 151 | 149 | 138 | 142 | 135 |
| Tc1(C) | 218 | 213 | 205 | 205 | 200 | 238 | 235 | 241 |
| Tc2(C) | — | — | — | 232 | 227 | 261 | 266 | 291 |
| Tc3(C) | — | — | — | — | — | — | — | — |
| Tr1(C) | 277 | 274 | 276 | 275 | 275 | 308 | 321 | 318 |
| Tr2(C) | 312 | 293 | — | 283 | 302 | — | — | — |
| Tr3(C) | — | 309 | — | 302 | — | — | — | — |

| MELT | M678 | M680 | M686 | M687 | M688 | M689 | M690 | M691 |
|---|---|---|---|---|---|---|---|---|
| Ag2O | 27.3 | 28.1 | 59.8 | 61.2 | 57.8 | 53.7 | 47.6 | 59.8 |
| V2O5 | 18.9 | 19.4 | 28.2 | 28.8 | 27.2 | 25.3 | 22.4 | 28.2 |
| TeO2 | 10.0 | 12.0 | 9.0 | 9.0 | 9.0 | 9.0 | 9.0 | 6.0 |
| PbO2 | 20.0 | 12.0 | | | | 9.0 | 18.0 | |
| MoO3 | | | | | | | | |
| Pb3O4 | | | | | | | | |
| Tl2O3 | 23.8 | 24.5 | | | | | | |
| PbO | | | | | | | | |
| P2O5 | | 4.0 | | | | | | |
| SeO2 | | | | | | | | |
| CuO | | | 3.0 | 1.0 | 6.0 | 3.0 | 3.0 | 3.0 |
| B2O3 | | | | | | | | |
| ZnO | | | | | | | | 3.0 |
| WO3 | | | | | | | | |
| SiO2 | | | | | | | | |
| TOTAL % | 100.0 | 100.0 | 100.0 | 100.0 | 100.0 | 100.0 | 100.0 | 100.0 |
| Tg(C) | 140 | 150 | 146 | 137 | 150 | 139 | 147 | 149 |
| Tc1(C) | 222 | 240 | 206 | 190 | 202 | 211 | 205 | 226 |
| Tc2(C) | 272 | 259 | 305 | 317 | — | 315 | 235 | — |
| Tc3(C) | 295 | 300 | 356 | — | — | — | — | — |
| Tr1(C) | 309 | 350 | 250 | 298 | 321 | 275 | 276 | 323 |
| Tr2(C) | — | — | — | 240 | — | 365 | 349 | 337 |
| Tr3(C) | — | — | — | — | — | 303 | — | — |

| MELT | M692 | M698 | M699 | M700 | M705 | M712 | M713 | M714 |
|---|---|---|---|---|---|---|---|---|
| Ag2O | 61.9 | 36.7 | 28.1 | 46.0 | 47.4 | 39.3 | 42.2 | 42.4 |
| V2O5 | 29.1 | 20.9 | 19.4 | 22.9 | 21.5 | 19.9 | 18.5 | 21.5 |
| TeO2 | 3.0 | 9.3 | 9.3 | 8.9 | 8.9 | 22.7 | 23.9 | 19.8 |
| PbO2 | | 18.7 | 18.7 | 22.2 | 22.2 | | | |
| MoO3 | | | | | | 18.1 | 15.4 | 16.3 |
| Pb3O4 | | | | | | | | |
| Tl2O3 | | 14.4 | 24.5 | | | | | |
| PbO | | | | | | | | |
| P2O5 | | | | | | | | |
| SeO2 | | | | | | | | |
| CuO | 3.0 | | | | | | | |
| B2O3 | | | | | | | | |
| ZnO | 3.0 | | | | | | | |
| WO3 | | | | | | | | |
| SiO2 | | | | | | | | |
| TOTAL % | 100.0 | 100.0 | 100.0 | 100.0 | 100.0 | 100.0 | 100.0 | 100.0 |
| Tg(C) | 146 | 144 | 143 | 156 | 155 | 209 | 200 | 201 |
| Tc1(C) | 195 | 211 | 210 | 212 | 207 | 297 | 294 | 265 |
| Tc2(C) | 265 | 260 | 261 | 245 | — | — | — | — |
| Tc3(C) | — | 297 | — | — | — | — | — | — |
| Tr1(C) | 359 | 313 | 313 | 276 | 268 | — | — | — |
| Tr2(C) | 321 | 279 | 286 | 266 | 300 | — | — | — |
| Tr3(C) | — | — | — | — | — | — | — | — |

| MELT | M715 | M716 | M717 | M718 | M719 | M720 | M722 | M723 |
|---|---|---|---|---|---|---|---|---|
| Ag2O | 54.9 | 57.8 | 54.5 | 48.4 | 61.7 | 58.5 | 60.5 | 61.9 |
| V2O5 | 19.2 | 27.2 | 25.7 | 22.9 | 28.5 | 27.0 | 28.5 | 29.1 |
| TeO2 | 20.1 | 10.0 | 9.9 | 8.8 | 5.0 | 10.0 | 9.0 | 6.0 |
| PbO2 | | | | | | | | |
| MoO3 | 5.8 | 5.0 | 9.9 | 19.9 | 4.8 | 4.5 | 2.0 | 3.0 |
| Pb3O4 | | | | | | | | |
| Tl2O3 | | | | | | | | |
| PbO | | | | | | | | |
| P2O5 | | | | | | | | |
| SeO2 | | | | | | | | |
| CuO | | | | | | | | |
| B2O3 | | | | | | | | |
| ZnO | | | | | | | | |
| WO3 | | | | | | | | |
| SiO2 | | | | | | | | |
| TOTAL % | 100.0 | 100.0 | 100.0 | 100.0 | 100.0 | 100.0 | 100.0 | 100.0 |
| Tg(C) | 159 | 151 | 165 | 189 | 144 | 151 | 141 | 141 |
| Tc1(C) | 281 | 189 | 202 | 220 | 173 | 189 | 178 | 170 |
| Tc2(C) | 227 | 281 | — | 310 | — | 276 | 270 | — |
| Tc3(C) | 343 | — | — | — | — | — | — | — |
| Tr1(C) | 318 | 357 | 372 | — | 299 | 259 | 337 | 332 |
| Tr2(C) | 248 | — | 300 | — | 339 | — | 324 | 284 |

TABLE III-continued

| Tr3(C) | — | — | — | — | — | — | — | — |
|---|---|---|---|---|---|---|---|---|
| MELT | M724 | M726 | M727 | M728 | M729 | M730 | M731 | M732 |
| Ag2O | 61.9 | 54.4 | 47.6 | 51.0 | 44.2 | 60.3 | 56.9 | 57.5 |
| V2O5 | 29.1 | 25.6 | 22.4 | 24.0 | 20.8 | 27.7 | 26.1 | 26.5 |
| TeO2 | 7.0 | 5.0 | 5.0 | 10.0 | 10.0 | 3.0 | 3.0 | 7.0 |
| PbO2 |  | 10.0 | 20.0 | 10.0 | 20.0 | 7.0 | 12.0 | 7.0 |
| MoO3 | 2.0 | 5.0 | 5.0 | 5.0 | 5.0 | 2.0 | 2.0 | 2.0 |
| Pb3O4 |  |  |  |  |  |  |  |  |
| Tl2O3 |  |  |  |  |  |  |  |  |
| PbO |  |  |  |  |  |  |  |  |
| P2O5 |  |  |  |  |  |  |  |  |
| SeO2 |  |  |  |  |  |  |  |  |
| CuO |  |  |  |  |  |  |  |  |
| B2O3 |  |  |  |  |  |  |  |  |
| ZnO |  |  |  |  |  |  |  |  |
| WO3 |  |  |  |  |  |  |  |  |
| SiO2 |  |  |  |  |  |  |  |  |
| TOTAL % | 100.0 | 100.0 | 100.0 | 100.0 | 100.0 | 100.0 | 100.0 | 100.0 |
| Tg(C) | 137 | 147 | 152 | 155 | 162 | 131 | 134 | 138 |
| Tc1(C) | 170 | 222 | 214 | 248 | 241 | 181 | 189 | 210 |
| Tc2(C) | 277 | — | 234 | 275 | — | 190 | 329 | 338 |
| Tc3(C) | — | — | — | 350 | — | — | — | 274 |
| Tr1(C) | 328 | 323 | 296 | 264 | 298 | 331 | 348 | 314 |
| Tr2(C) | 270 | 263 | 314 | 305 | — | 291 | 318 | 293 |
| Tr3(C) | — | 293 | 348 | 341 | — | — | 291 | 264 |
| MELT | M733 | M734 | M735 | M736 | M737 | M738 | M739 | M740 |
| Ag2O | 54.1 | 46.9 | 47.7 | 47.4 | 5.9 | 61.3 | 54.5 | 47.6 |
| V2O5 | 24.9 | 22 | 22.3 | 22.2 | 32.3 | 28.7 | 25.5 | 22.4 |
| TeO2 | 7.0 | 8.9 | 9.0 | 9.0 | 59.8 |  |  |  |
| PbO2 | 12.0 | 22.2 |  |  |  | 10.0 | 20.0 | 30.0 |
| MoO3 | 2.0 |  |  |  |  |  |  |  |
| Pb3O4 |  |  |  | 21.4 |  |  |  |  |
| Tl2O3 |  |  |  |  |  |  |  |  |
| PbO |  |  | 21 |  | 2 |  |  |  |
| P2O5 |  |  |  |  |  |  |  |  |
| SeO2 |  |  |  |  |  |  |  |  |
| CuO |  |  |  |  |  |  |  |  |
| B2O3 |  |  |  |  |  |  |  |  |
| ZnO |  |  |  |  |  |  |  |  |
| WO3 |  |  |  |  |  |  |  |  |
| SiO2 |  |  |  |  |  |  |  |  |
| TOTAL % | 100.0 | 100.0 | 100.0 | 100.0 | 100.0 | 100.0 | 100.0 | 100.0 |
| Tg(C) | 141 | 156 | 151 | 156 | 256 | 122 | XSTAL | XSTAL |
| Tc1(C) | 327 | 208 | 201 | 210 | — | 166 | 172 | — |
| Tc2(C) | 209 | — | 265 | — | — | 207 | — | — |
| Tc3(C) | — | — | — | — | — | — | — | — |
| Tr1(C) | 315 | 276 | 291 | 277 | — | 351 | 360 | — |
| Tr2(C) | 299 | — | 301 | — | — | 276 | — | — |
| Tr3(C) | 266 | — | — | — | — | 295 | — | — |
| MELT | M741 | M742 | M743 | M744 | M745 | M746 | M747 | M748 |
| Ag2O | 57.1 | 59.5 | 50.8 | 52.1 | 52.1 | 58.4 | 60.5 | 61.8 |
| V2O5 | 22.9 | 20.5 | 18.1 | 16.8 | 16.8 | 21.6 | 19.5 | 18.2 |
| TeO2 |  |  | 8.9 | 8.9 | 4.9 |  |  |  |
| PbO2 | 20.0 | 20.0 | 22.2 | 22.2 | 26.2 | 20.0 | 20.0 | 20.0 |
| MoO3 |  |  |  |  |  |  |  |  |
| Pb3O4 |  |  |  |  |  |  |  |  |
| Tl2O3 |  |  |  |  |  |  |  |  |
| PbO |  |  |  |  |  |  |  |  |
| P2O5 |  |  |  |  |  |  |  |  |
| SeO2 |  |  |  |  |  |  |  |  |
| CuO |  |  |  |  |  |  |  |  |
| B2O3 |  |  |  |  |  |  |  |  |
| ZnO |  |  |  |  |  |  |  |  |
| WO3 |  |  |  |  |  |  |  |  |
| SiO2 |  |  |  |  |  |  |  |  |
| TOTAL % | 100.0 | 100.0 | 100.0 | 100.0 | 100.0 | 100.0 | 100.0 | 100.0 |
| Tg(C) | XSTAL | XSTAL | 165 | 165 | XSTAL | XSTAL | XSTAL | XSTAL |
| Tc1(C) | — | 341 | 193 | 194 | — | — | — | — |
| Tc2(C) | — | — | 252 | 250 | — | — | — | — |
| Tc3(C) | — | — | — | — | — | — | — | — |
| Tr1(C) | — | 105 | 294 | 295 | — | — | — | — |
| Tr2(C) | — | — | 264 | 313 | — | — | — | — |
| Tr3(C) | — | — | — | — | — | — | — | — |
| MELT | M749 | M750 | M751 | M752 | M753 | M754 |  |  |
| Ag2O | 64 | 62.7 | 64.6 | 66.7 | 49.3 | 49.3 |  |  |
| V2O5 | 30 | 31.3 | 29.4 | 31.3 | 19.6 | 19.6 |  |  |
| TeO2 |  |  |  |  | 8.9 | 7.2 |  |  |
| PbO2 | 6.0 | 6.0 | 6.0 | 2.0 | 22.2 | 23.9 |  |  |

TABLE III-continued

| | | | | | | |
|---|---|---|---|---|---|---|
| MoO3 | | | | | | |
| Pb3O4 | | | | | | |
| Tl2O3 | | | | | | |
| PbO | | | | | | |
| P2O5 | | | | | | |
| SeO2 | | | | | | |
| CuO | | | | | | |
| B2O3 | | | | | | |
| ZnO | | | | | | |
| WO3 | | | | | | |
| SiO2 | | | | | | |
| TOTAL % | 100.0 | 100.0 | 100.0 | 100.0 | 100.0 | 100.0 |
| Tg(C) | 120 | 123 | XSTAL | 116 | 159 | 159 |
| Tc1(C) | 161 | 162 | 157 | 152 | 202 | 187 |
| Tc2(C) | — | — | — | — | 273 | 266 |
| Tc3(C) | — | — | — | — | — | — |
| Tr1(C) | 357 | 356 | 357 | 366 | 294 | 292 |
| Tr2(C) | — | — | — | — | 308 | 248 |
| Tr3(C) | — | — | — | — | — | — |

From this group of examples, a particularly preferred glass composition was chosen, namely, example M666. Note that many melts have more than one crystallization and/or remelt temperature. The M666 melt displays a single low temperature remelt which is ideal because the glass reaches a low viscosity state for bonding at a lower temperature. The details of this composition and the processes of forming a Ag/glass die-attach paste which when after processing as a die attach paste contain a significant amount of crystallinity according to the present invention are described below.

The preferred composition, M666, was weighed in a large batch as follows:

| weight % on an oxide basis | wt (gm) |
|---|---|
| Ag2O | 46.9 | 140.7 |
| V2O5 | 22.0 | 66.0 |
| TeO2 | 8.9 | 26.7 |
| PbO2 | 22.2 | 66.6 |
| | 100.0 | 300.0 gm |

The oxides were weighed and thoroughly blended together in a plastic container. Purity of the oxides were 99.9% minimum with very low alkali content. The mobility of alkali ions is known to cause corrosion in semiconductor packaging.

The blend was then transferred to a porcelain crucible and placed in a melting furnace. After reaching approximately 550° C., the melt was removed and stirred to assure complete melting and homogeneity and then placed back in the furnace and heated to a peak temperature of 580°–600° C. After holding the temperature above 580° C., but not greater than 620° C., the melt was poured through cold stainless steel rollers creating thin sheets of a vitreous glass which is ideal for subsequent grinding. Peak temperatures of less than about 580° C. or greater than about 620° C. was shown to create multiple and higher temperature remelts.

The resulting glass flakes were then crushed and loaded into a high alumina jar mill with high density grinding media, such as Al2O3 or zirconia, along with acetone and wet ground to a fine powder. After drying, the fine glass powder was sieved. The resulting average particle size was measured by surface area, which fell within 0.1 to 0.5 m²/gm. Powders with surface area much greater than 0.5 m²/gm had a tendency to create excessive crystallization during the refire.

The resulting fine powder was analyzed thermally by the DSC and had the following properties.

| | |
|---|---|
| 152.4° C. | Tg (glass transition temperature) |
| 199.2° C. | Tc (glass crystallizing peak temperature) |
| 275.8° C. | Tr (glass remelt peak temperature) |

Figure 2:
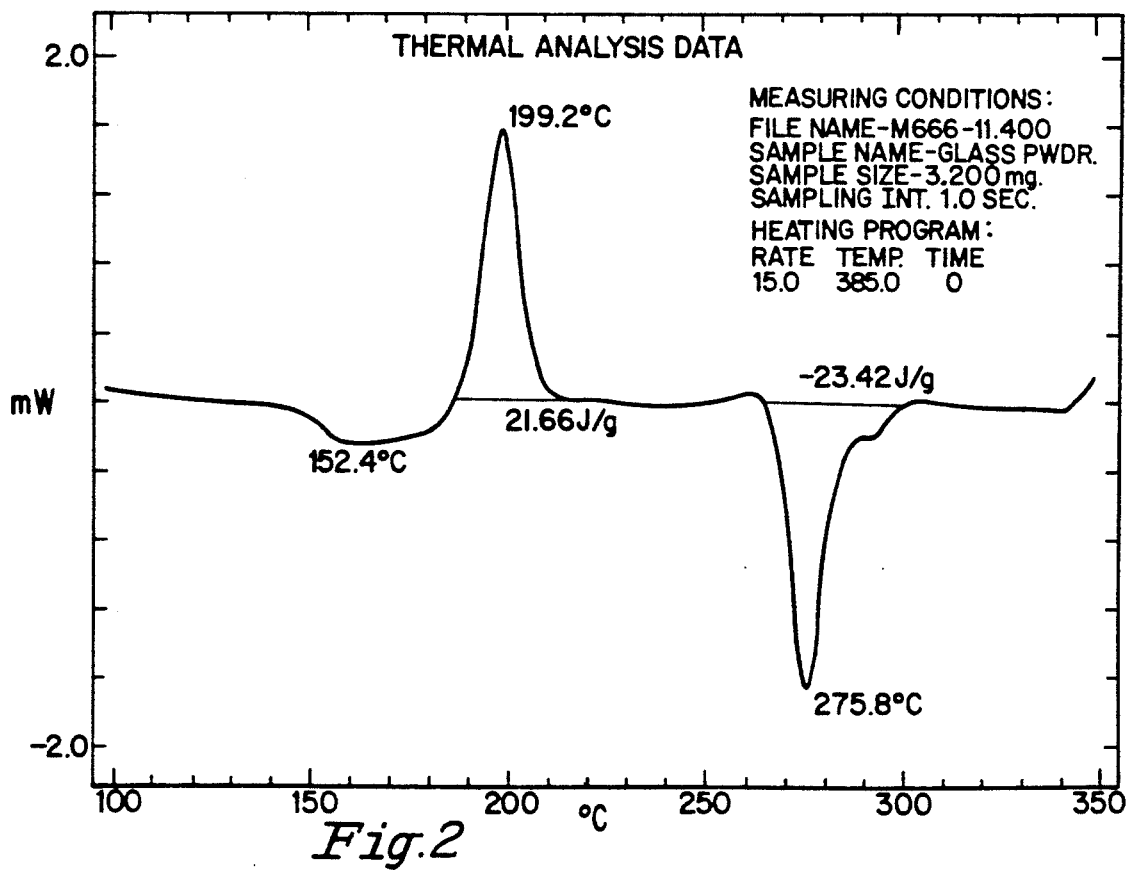
FIG. 2 is a more detailed DSC plot of Curve B in FIG. 1 showing the Tg, Tc & Tr and the associated enthalpy values.

These results are depicted graphically in FIG. 2 for the glass composition M666. These properties are summarized in Table III for most of the melts recorded. The most preferred glass (M666) has only one crystal peak and one low temperature remelt peak, which is ideal as previously discussed.

The oxidation state of the Pb used in the melt formulation was shown to have a significant impact on the properties of the glasses of the present invention as shown by M734, M735, and M736 of Table III. The Pb cation ratio was kept constant which explains the slight difference in the weight percentages of PbO2, PbO, and Pb3O4. Note in M735 which utilizes PbO, (the preferred ingredient in the Friesen '071 patent), there are 2 crystal peaks and 2 higher temperature remelts. M736 utilizing Pb3O4, on the other hand, behaved similar to M734 utilizing PbO2, yielding a single lower temperature remelt, the preferred result.

Unlike the Ag/glass described in U.S. Pat. No. 4,933,030, the preferred solvents are mixtures of basically aromatic and aliphatic solvent with a very small amount of resin dissolved therein to give the best combination of theology for dispensing the paste in actual use and minimum voiding under large area die. Basically, the preferred solvents were those of low hydrogen bonding (polarity) which gave the best overall results in voiding and adhesion. The aromatic solvent chosen was SureSol 205 from Koch Chemical and the aliphatic was 686 solvent from Exxon. The resin used was a very high molecular weight ethyl cellulose known as EHEC. Thus, the organic system (vehicle) in the preferred embodiment consisted of a 2:1 ratio of the above solvents with ⅛% EHEC dissolved therein.

A particular advantage of a blend of two or more solvents is the broader temperature range of the solvent evolution during processing. Using one solvent usually results in a high weight loss over a relatively short temperature range. If this weight loss, a solvent evolution, occurs too rapidly, voiding or poor adhesion could occur in the Ag/glass matrix beneath the die being attached. Using a solvent blend distributes the weight loss over a wider temperature range, assuming the blended solvents are different in temperatures at which evolution occurs.

A Ag paste was made first before making a Ag/glass paste. Although a partially preferred Ag flake was used in the present invention, it is recognized that many other forms of silver, other metals, oxides, etc. can be used as powders, flakes, or mixtures of powders and flakes. The preferred flake is one produced by Chemet Corp. called Number 295. However, many other Ag flakes or powders were tested, ranging from surface areas of 0.67 to 1.55 m²/gm and tap densities ranging from 3.2 to 4.6 gm/cc. The flake was mixed with the vehicle @ 88% as shown below:

|  |  |  |
|---|---|---|
| 295 Ag Flake | 88 g | 88% |
| Vehicle | 12 g | 12% |
|  | 100 g |  |

The Ag paste was thoroughly blended and then dispersed into a homogeneous creamy paste by passing it through a 3 roll mill. The Ag paste and glass powder were then blended together in a manner similar to that discussed above, to produce a 78% Ag/22% glass ratio in the fired structure. An example is given below:

|  | TOTAL | SOLIDS |
|---|---|---|
| Ag paste (88.0% solids) | 76.67 g | 67.47 g |
| Glass powder | 19.03 g | 19.03 g |
| Vehicle | 4.30 g |  |
|  | 100.0 g | 86.5 g |

The resulting Ag/glass paste was then used to attach silicon die to bare and/or Au metallized ceramic. This was accomplished by depositing a controlled volume of paste (the volume determined by the size of the die) with a positive displacement syringe. The die was placed on top of the deposited Ag/glass dot and pushed down uniformly to produce a fillet around the edge of the die as depicted in FIG. 4.

The assembly was then placed in a furnace and fired, typically at a peak temperature of 350° C. for 5 minutes. Because of the organic system used, no predrying step is required. During the heat up, the glass crystallizes and the organics are driven off before the remelt temperature of 275° C. The glass wets the interface at about 290°-300° C. and continues to wet as the Ag/glass structure sinters tighter pushing more glass to the interfaces. During the cool down of the assembly, the glass recrystallized again around 200° C. or slightly higher. It is this recrystallization that is one of the keys to the present invention responsible for the high initial adhesion and high retained adhesions after thermal cycling. Inspection revealed a void free assembly with excellent adhesion.

Figure 4:
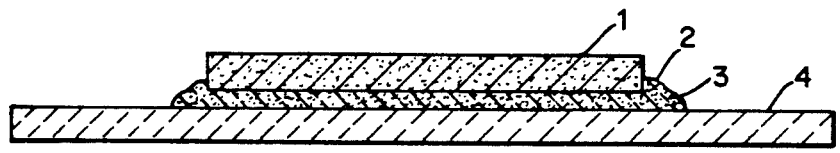
FIG. 4 is a side sectional view of a preferred environment of use of the present invention.

FIG. 4 illustrates a typical integrated circuit silicon chip 1 mounted on a ceramic substrate 4, the package being bonded together by a die-attach crystallizing glass 2 having Ag particles 3 dispersed therein. It will be understood by the skilled artisan that FIG. 4 is schematic only. In actual practice and in the preferred embodiments, the silver powder, being in relatively large amounts volumewise, fuses during the heating process and rarely remains as discrete particles as shown, thus rendering the ultimate bond structure opaque. The purpose of the schematic in FIG. 4 is to illustrate within the bounds of simple draftsmanship that the bond structure achieved is a solid structure of fused silver particles having between their interstices (i.e. substantially filling the interstices) a partially crystalline glassy adhesive structure of the glass composition of the present invention, essentially free of resin and organic solvent, and having a low moisture content.

PRECRYSTALLIZATION

Figure 3:
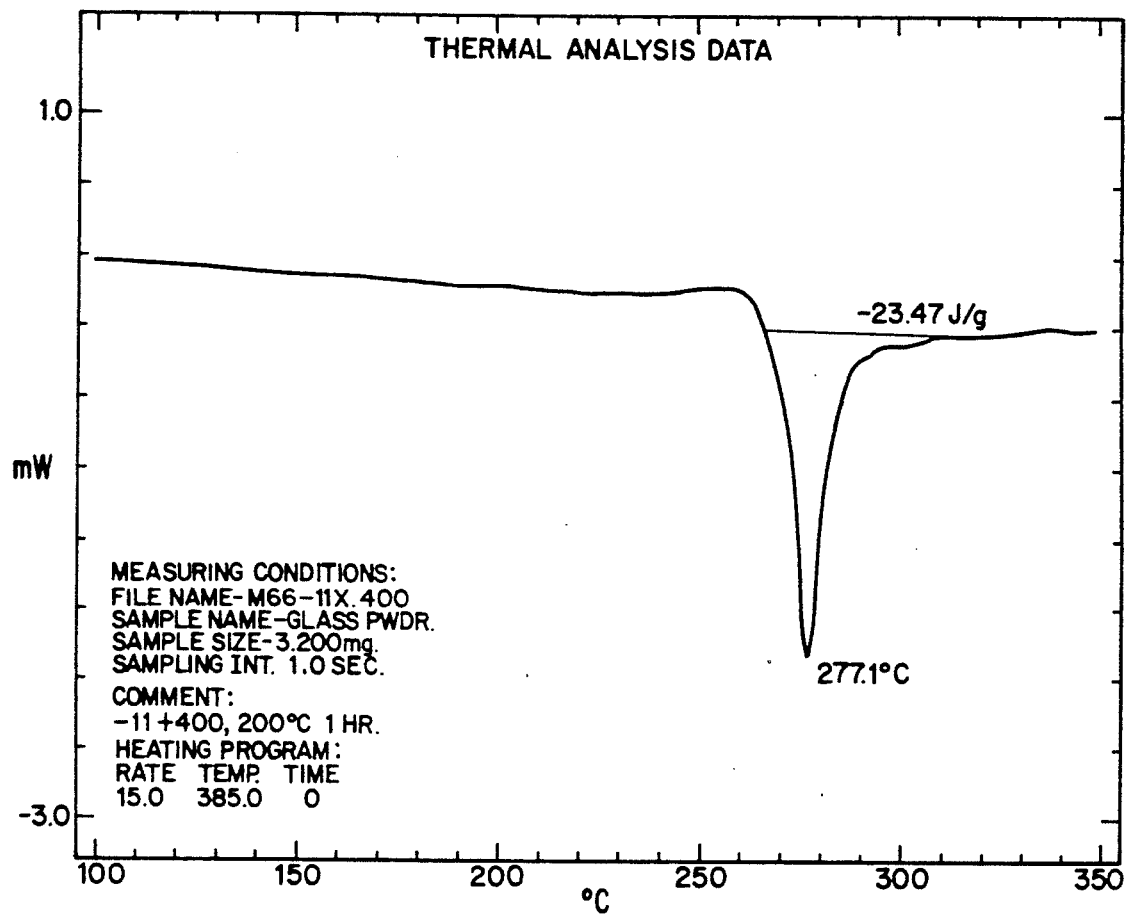
FIG. 3 is a DSC plot of a precrystallized glass of FIG. 2.

In processing large-area die, it was noted that if the glass was precrystallized before incorporating it into an Ag/glass paste, a wider process window was achieved. The precrystallizing was accomplished by baking the glass powder at a temperature of 185° to 250° C. for ¼ to 1 hour. After cooling, a sample was run in the DSC and the results are shown in FIG. 3. Note that there is no Tg reaction since this only occurs in a vitreous glass. Nor is there a crystallization peak (Tc) since the powder has already been crystallized by the baking cycle. The only activity is a single remelt at the normal 275° C., where the glass changes abruptly from a high viscosity of a solid to a low viscosity glass that wets the ceramic and semi-conductor die at low temperatures.

Some very significant advantages were noted in the processing of large area die by using the precrystallized glass powder, such as better wetting and higher adhesions, as shown below:

| LOT# | DESCRIPTION | DIE SIZE | ADH % A (1) |
|---|---|---|---|
| B499 | Standard Glass-FIG. 2 | 2 cm | 115# 57A |
| B500 | Prexstal Glass-FIG. 3 | 2 cm | 227# 100A |

(1) % A denotes the percent of the desirable failure mode occuring within the Ag/glass matrix (cohesive) as opposed to that occuring at the interface (adhesive).

The improved results when using the precrystallized glass is thought to be due to the glass powder outgassing during the precrystallizing bake caused by the crystallization itself. The rearrangement of the amorphous glass during crystallization apparently pushes out substantially all absorbed gas in the structure and results in a denser glass of tightly packed crystals. This was evident by the smaller volume occupied by a precrystallized glass powder when compared to a vitreous (not precrystallized) of the same weight. Eliminating the Tg may also allow more time to drive off organics without entrapment during the processing.

Most of the prior art in low temperature glasses teach ways to keep the glass from devitrifying because of the instability of the glass, i.e., the uncontrolled crystallinity. The glasses of the present invention, however, are capable of having an inherent amount of crystallization which is controlled by the specific composition, the melting process, and the application process of the Ag/glass. The resultant glass/ceramic formed in the final assembly results in properties far exceeding other low temperature glasses as well as many high temperature glasses.

Another significant advantage the Ag/glass paste described in the present invention has over the Ag/glass paste described in U.S. Pat. No. 4,933,030 is the higher temperature processing capabilities. The vitreous nature of the glass of U.S. Pat. No. 4,933,030 prevents processing above about 400° C. without a significant decrease in adhesion. The M666 glass, however, because of its partially crystallized nature, can be fired at 450° C. with excellent adhesions as shown below.

TABLE IV

| Firing Temperature | Adhesion (.400" × .400" Die) |
|---|---|
| 300° C. | 220 lbs |
| 350° C. | 198 lbs |
| 450° C. | 220 lbs |

This wide range of firing temperature allows applications in which the die-attach is done at low temperatures, e.g. 350° C., and subsequently sealed (glass) at high temperatures, e.g. 450° C.

SEALING GLASS

Because the unique glass of the present invention has no water soluble components, the chemical durability is excellent, as was determined by the insignificant weight loss of the glass when heated in $H_2O$. This chemical durability, along with the low temperature properties of the glass, makes this glass an ideal candidate for hermetically sealing ceramic packages at lower temperatures.

To evaluate the feasibility of achieving adequate bonding of two ceramic surfaces using the present invention, the finely divided particles of M666 (as previously described in detail) were made into a paste consisting of:

| 80% M666 glass particles |
|---|
| 20% 686 solvent |
| 100% |

This paste was thoroughly mixed and doctor bladed to a ceramic surface of a 92% black $Al_2O_2$ body (commonly used in ceramic packaging) and subsequently heated to 350° C. for 10 minutes and cooled down. Inspection revealed a homogeneous crystallized glass with good adhesion to the ceramic. However, the cross section revealed a porous structure filled with many small bubbles. These bubbles could essentially be eliminated by precrystallizing the glass powder before the sealing process. This was accomplished in the same manner as was done with the Ag/glass, namely baking the glass powder at a temperature of 185°-250° C. for ½ to 1 hour, which crystallizes the glass as illustrated graphically in FIG. 3.

When put in a paste with the Exxon aliphatic 686 solvent, doctor bladed on a ceramic surface, heated to 350° C. for 10 minutes, cooled to room temperature and inspected, the porosity disappeared and a smooth glaze was evident. This unexpected result is thought to be due to the glass powder outgassing during the precrystallizing bake, as explained earlier, as well as allowing organics to excape before entrapment.

It is well known in the art that thermal expansion modifiers can be used as fillers with the glass powder to more closely match the expansion of the adjoining ceramic body, creating a more thermal shock resistant structure. The following expansion modifiers of low expansions were admixed at various amounts with the pre-crystallized glass powder of M666 and the 686 solvent - $Nb_2O_5$, $Ta_2O_3$, $V_2O_5$, $PbTiO_3$, $ZrW_2O_8$, $SiO_2$, $TiO_2$, and $Y_2O_3$, doctor bladed on ceramic, heated to 350° C. for 10 minutes, allowed to lower to room temperature, and inspected.

Other expansion modifiers such as beta-eucriptite ($LiAlSiO_3$), amorphous silica, and various other phosphates, vanadates, arsenates, antimonates, mobates, and tantalates have been shown to improve their thermal shock resistance of sealed ceramic or metal/ceramic substrates, and are considered part of the present invention when used with the glass, either as a die attach paste or when sealing a variety of different ceramic or glass ceramic bodies.

THERMALLY CONDUCTIVE GLASS

Another potential application of the new glass is for an electrically insulating, high thermally dissipating adhesive for various discrete electronic components. A most common application would be for attaching semiconductor devices that need to be electrically insulated from the substrate yet provide good thermal dissipation through the adhesive. The common Ag/glass adhesive paste has both excellent electrical and thermal dissipation and hence is not applicable.

To assess the utility of the glasses of the present invention, the M355 glass powder was loaded with powders of the synthetic diamond powder, AlN, $Cu_2O$, Ni, Al, $Al_2O_3$, $BeO_2$ and BN all with excellent thermal conductivity. The most promising combination was with synthetic diamond powder from Engis Corporation. Diamond powders of different size and amounts were admixed with the M355 powder and terpineol to make a paste. This was applied to a ceramic and a silicon die placed on top. The assembly was fired, similar to an Ag/glass paste, to 350° C. for 10 minutes and allowed to cool. Diamond powder of a size of 15236 microns loaded at 40% of the glass powder, was found to give superior adhesion along with excellent thermal conductivity. Other high thermally conductive ceramic or metal powders could be used for this application and are considered part of the invention.

It is apparent that many minor modifications and variations of the present invention are obvious to those skilled in the art of glass making, Ag/glass paste making, sealing glasses, semiconductor packaging, and related arts. For example, any precursors of the oxides, such as carbonates, nitrates, sulphates, etc., can be used in place of the oxides, since they break down to the oxides during the melting process. Such modifications, additions, or improvements are thus considered a part of the present invention, the scope of which is determined by the following claims:

I claim:

1. A crystallizing glass composition which consists essentially of, by weight on an oxide basis, about:
   about 47% $Ag_2O$
   about 22% $V_2O_5$
   about 9% $TeO_2$
   about 22% $PbO_2$.

2. A crystallizing glass composition which consists essentially of, by weight on an oxide basis:
   about 40-65% $Ag_2O$
   about 15-35% $V_2O_5$
   and about 5-20% $TeO_2$.

3. A crystallizing glass composition comprising, by weight on an oxide basis:
   about 40-65%
   about 15-35% $V_2O_5$
   and about 5-25% $TeO_2$.

4. The crystallizing glass of claims 2 or 3 wherein the ratio of $Ag_2O$ to $TeO_2$ is greater than 2.

5. A crystallizing glass composition which consists essentially of, by weight n an oxide basis:
   about 40-65% $Ag_2O$
   about 15-35% $V_2O_5$ and about 5–20% of at least one of a group consisting of $TeO_2$, $PbO_2$ and $Pb_3O_4$.

6. The crystallizing glass of claim 5 wherein the ratio of $Ag_2O$ to at least one of the group consisting of $TeO_2$, $PbO_2$ and $Pb_3O_4$ is greater than 2.

7. A crystallizing glass composition which consists essentially of, by weight on an oxide basis:
about 45–65% $Ag_2O$
about 15–35% $V_2O_5$
and about 5–20% of at least one of a group consisting of $TeO_2$, PbO, $PbO_2$ and $Pb_3O_4$.

8. A crystallizing glass composition which consists essentially of, by weight on an oxide basis:
about 40–65% $Ag_2O$
about 15–35% $V_2O_5$
about 0–20% $TeO_2$
and about 0–30% of a group consisting of $PbO_2$ and $Pb_3O_4$.

9. A crystallizing glass composition which consists essentially of, by weight on an oxide basis:
about 40–50% $Ag_2O$
about 15–25% $V_2O_5$
about 5–25% $TeO_2$
and about 5–30% of a group consisting of $PbO_2$ and $Pb_3O_4$.

10. A crystallizing glass composition comprising, by weight on an oxide basis:
about 40–50% $Ag_2O$
about 15–25% $V_2O_5$
about 5–25% $TeO_2$
and about 5–30% of a group consisting of $PbO_2$ and $Pb_3O_4$.

11. An essentially resin-free paste comprising the glass of claim 1, 2, 3, 5, 7, 8, 9 or 10 and an organic solvent and a resin percentage of less than 0.1% of the paste.

12. A paste according to claim 11 wherein said solvent is an aromatic solvent and said paste further includes conductive metallic particles selected from the group consisting of Ag, Au, Al, Cu, Ni, Pd, An, Sn and Pt.

13. A paste according to claim 11 wherein said solvent is an aliphatic solvent and said paste further includes conductive metallic particles selected from the group consisting of Ag, Au, Al, Cu, Ni, Pd, Zn, Sn and Pt.

14. A paste according to claim 11 wherein said paste includes non-electrically conductive ceramic particles selected from the group consisting of synthetic diamond, boron nitride, aluminum nitride, beryillia and alumina.

15. A paste according to claim 11, 12 or 13 wherein said paste consists essentially of by weight about 67% silver flake with a surfactant, about 18% glass, about 15% of said solvent.

16. A sealing glass composition comprising the crystallizing glass composition of claims 1, 2, 3, 5, 7, 8, 9 or 10.

17. The sealing glass of claim 16 further comprising an effective amount of an expansion modifying filler, such that the thermal expansion coefficient of the glass is reduced.

18. The glass paste composition of claim 11 further comprising a non-electrically conductive, high thermally conductive powder.

* * * * *